United States Patent [19]

Pepper et al.

[11] 4,168,969

[45] Sep. 25, 1979

[54] RECOVERY OF SILVER, COPPER, ZINC AND LEAD FROM PARTIALLY ROASTED PYRITE CONCENTRATE BY ACID CHLORIDE LEACHING

[75] Inventors: Terry W. Pepper, Golden; Harry G. Bocckino, Lakewood, both of Colo.

[73] Assignee: Texasgulf Inc., Stamford, Conn.

[21] Appl. No.: 897,017

[22] Filed: Apr. 17, 1978

[51] Int. Cl.² .................. C22B 11/06; C22B 15/08; C22B 19/22; C22B 13/04

[52] U.S. Cl. ........................... 75/104; 75/117; 75/118 R; 75/120; 423/24; 423/511; 423/571

[58] Field of Search ............ 75/104, 117, 118 R, 75/120, 101 BE; 423/511, 571, 24

[56] References Cited

U.S. PATENT DOCUMENTS

| | | | |
|---|---|---|---|
| 210,619 | 12/1878 | Mason | 75/1 R |
| 1,434,087 | 10/1922 | Christensen | 204/66 |
| 1,434,088 | 10/1922 | Christensen | 423/103 |
| 1,435,891 | 11/1922 | Christensen | 75/119 |
| 1,441,063 | 1/1923 | Christensen | 75/117 |
| 1,456,784 | 5/1923 | Christensen | 75/104 X |
| 1,570,777 | 1/1926 | Pike | 75/104 |
| 1,588,806 | 6/1926 | Pike et al. | 75/101 R |
| 1,736,659 | 11/1929 | Mitchell | 75/104 X |
| 3,034,864 | 5/1962 | Nashner et al. | 423/571 X |
| 3,109,732 | 11/1963 | Goren | 75/101 R |
| 3,414,403 | 12/1968 | Bray et al. | 423/24 |
| 3,476,554 | 11/1969 | Spedden et al. | 75/109 |
| 3,529,957 | 9/1970 | Kunda et al. | 75/117 X |
| 3,634,071 | 1/1972 | Spedden et al. | 75/109 |
| 3,661,563 | 5/1972 | Spedden et al. | 75/101 R |
| 3,669,651 | 6/1972 | Spedden et al. | 75/104 |
| 3,819,797 | 6/1974 | Spedden et al. | 423/27 |
| 3,966,462 | 6/1976 | Posel et al. | 75/101 BE |
| 4,018,865 | 4/1977 | Gallacher | 423/24 |

*Primary Examiner*—G. Ozaki
*Attorney, Agent, or Firm*—Kenyon & Kenyon

[57] ABSTRACT

A process for treating a pyrite concentrate containing silver, copper, lead and zinc to recover the metals contained therein is disclosed. The process includes the partial roasting of the concentrate to open the pyrite matrix to solution penetration followed by various hydrometallurgical steps, including oxidation and reduction leaching, solid-liquid separation and metal extraction steps, to recover the copper and silver together, and the lead and zinc separately.

15 Claims, 1 Drawing Figure

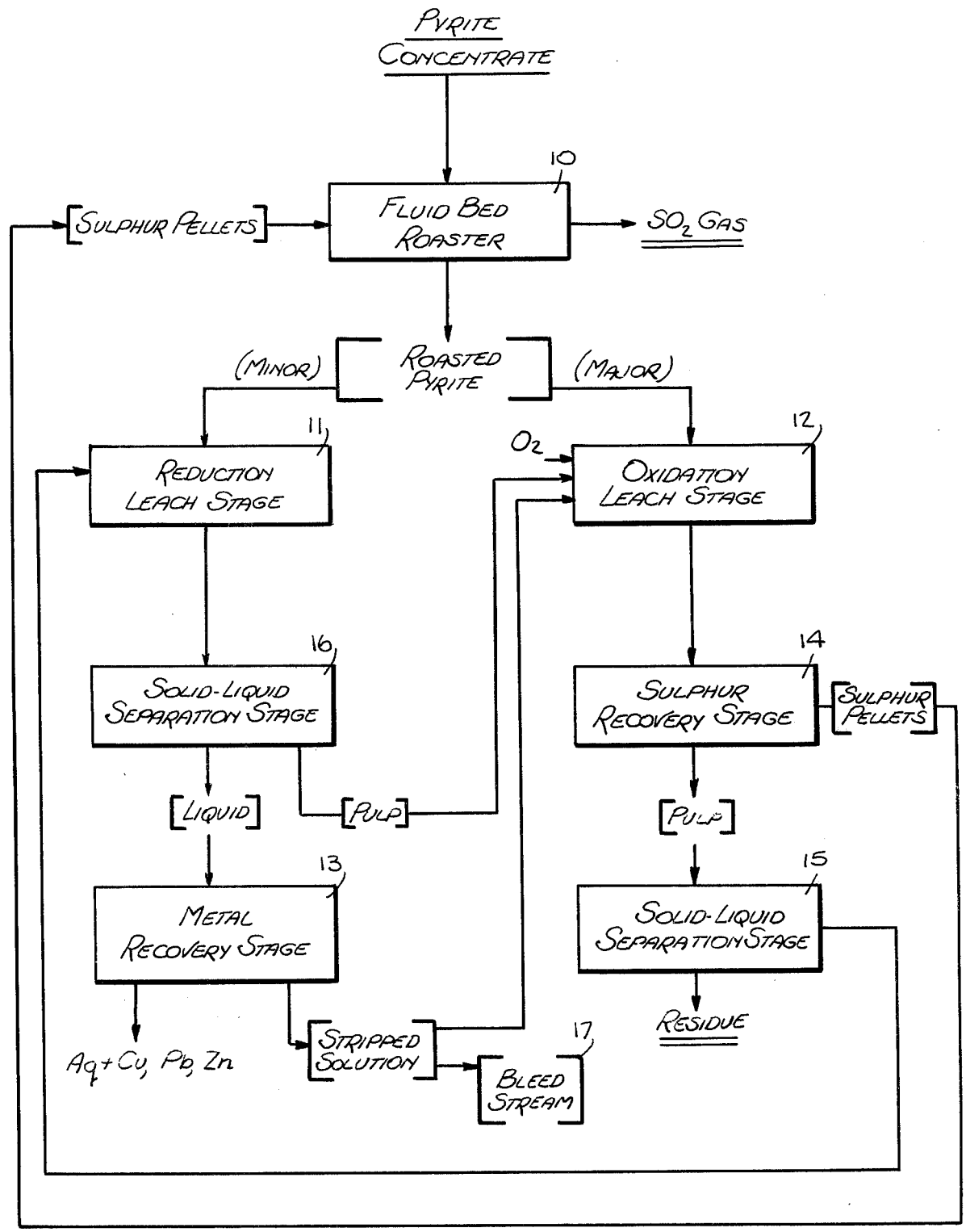

4,168,969

RECOVERY OF SILVER, COPPER, ZINC AND LEAD FROM PARTIALLY ROASTED PYRITE CONCENTRATE BY ACID CHLORIDE LEACHING

BACKGROUND OF THE INVENTION

1. Field of the Invention

This invention relates to a process for treating sulphur containing ores, and more particularly, is directed to a process for recovering copper, silver, zinc and lead from a partially roasted pyrite concentrate by chloride leaching.

2. Description of the Prior Art

In the past a variety of processes have been used for the extraction of metals and non-metals from sulphide ores. In many of these processes the sulphide ores have been subjected to concentration steps prior to recovery of specific metal values contained therein. Most of these processes suffer from the same disadvantage, in that they are incapable of recovering all the metal values in the ore using one economical process.

In addition many of the prior art processes have been limited to specific ores and concentrates which have a high concentration of the desired components to make the removal of those components economically feasible.

In a number of the above mentioned processes the sulphide ore concentrates are subjected to chloride leaching techniques to recover the metal values contained therein. Some of these processes include a thermal decomposition of the pyrite concentrate prior to the chloride leaching step. However, in many of these prior art processes the pyrite concentrate matrix is virtually unattacked by the initial heating of the pyrite and therefore a significant portion of the metal values occluded in the pyrite is lost, since they cannot be reached by the leach solution.

The process of the present invention provides for the opening of the pyrite matrix prior to the leaching stage thereby increasing solution penetration and resulting in higher percentages of metal extraction.

SUMMARY OF THE INVENTION

The present invention relates to a method for the extraction and recovery of metals and sulphur from pyrite concentrate. In accordance with the present invention, the pyrite concentrate is roasted to open the pyrite matrix to solution penetration. Subsequent to roasting the pyrite is split into two fractions, the larger of which is leached under oxidizing conditions. When the leaching is complete, the pulp is flashed to cool the solution and to reduce the volume of the leach liquor. Wash water is then added to the oxidation leached pulp to further cool the material and to complete the solidification of the molten elemental sulphur generated during leaching. The oxidation leached pulp, after sulphur removal, is flocculated, and a solid-liquid separation is accomplished by settling. The settled pulp is filtered and washed and the pulp discarded.

The solution recovered from the oxidation leach stage is then reduced by contacting it with a small amount of roasted pyrite concentrate in a reduction leach stage.

After the reduction stage is completed the pulp is flocculated and filtered. The filter cake or pulp is then returned to the oxidation leach stage to recover any metal contained therein while the solution is treated to recover silver, copper, lead, and zinc.

The silver and copper are recovered from solution by precipitation with iron, while the lead is recovered by precipitation with zinc. The zinc is recovered by solvent extraction and electrowinning.

Accordingly, it is an object of the process of the present invention to recover copper, zinc, and lead from pyrite concentrate.

Another object of the process of the present invention is the recovery of silver from pyrite concentrate without the use of cyanide, which presents health hazards.

Another object of the process of the present invention is the production of a concentrated $SO_2$ gas stream for sulphuric acid production.

Still other objects and advantages of the present invention will be apparent from the specification and attached drawing.

BRIEF DESCRIPTION OF THE DRAWING

For a fuller understanding of the invention, reference is had to the following description taken in connection with the accompanying drawing wherein a flow chart of the preferred embodiment, indicating the various stages or steps in schematic form is shown.

DESCRIPTION OF THE PREFERRED EMBODIMENT

The process of the present invention comprises treating a pyrite concentrate containing silver, copper, lead and zinc to recover the metals. The process involves roasting the concentrate followed by hydrometallurgical steps to recover copper and silver together, and lead and zinc separately.

As shown by the flowsheet depicted in the drawing the process is composed of seven basic steps or stages those being: a pyrite roasting stage, an oxidation leach stage, a sulphur recovery stage, a first solid-liquid separation stage, a reduction leach stage, a second solid-liquid separation stage and a metal recovery stage.

For the purpose of clarity the process of the present invention will be described in reference to the above listed stages.

Pyrite Roasting Stage

Referring to the drawing the pyrite concentrate is introduced to fluid bed roaster 10 wherein a portion of the sulphur originally contained in the concentrate is driven off.

In order to completely open the pyrite matrix to leach solution penetration it has been calculated that at least 50% of the pyrite sulphur should be removed, however, it has been found in practice that somewhat less than 50% sulphur elimination is sufficient to allow satisfactory solution penetration to the occluded minerals. In cases where the roasting stage is also being used to evaporate water added for washing purposes, more than 50% sulphur elimination may be required to maintain the reaction temperature.

During the roasting stage exhaust gas will be generated. This gas consists primarily of nitrogen, water vapor, and sulphur dioxide and also contains slight amounts of oxygen and sulphur trioxide. This gas, after removal of entrained particles, may be used in the production of sulphuric acid.

It has been found that sulphur elimination of about 45% to 80% not only produces a strong $SO_2$ off-gas suitable for sulphuric acid production, but also opens the pyrite matrix sufficiently to allow rapid and essentially complete dissolution of the copper and zinc occluded therein by the leach solution.

In addition to the above the hot gases generated during roasting may be used in waste heat boilers to generate steam. However, when using waste heat boilers, about 80% sulphur elimination is preferred in order to produce maximal steam without forming ferrites in the roasted pyrite. Roasting temperatures of from about 550° C. to about 700° C. are suitable to prevent ferrite formation when sulphur elimination of from about 40% to about 80% is effected.

Oxidation Leach Stage

Subsequent to roasting, the pyrite concentrate is split into two fractions, the larger of which is introduced to the oxidation leach stage 12 where it undergoes oxidation in an acid-chloride solution. As would be understood by one skilled in the art any number of acid-chloride solutions may be used, preferrably containing an oxidizing agent such as ferric ion.

The acid-chloride solutions of the invention should contain three ionic species: chloride ion to complex metals and increase the leaching rate, ferric ion or other oxidizing agents to react with the minerals in the roasted pyrite, and hydrogen ions to increase the solution acidity, thereby increasing the ferric ion solubility and the reaction rate.

As can be seen in the drawing, two solution streams enter the oxidation leach stage. The first of these solutions is the stripped solution from the metal recovery stage 13 which acts as a lixiviant for the oxidation leaching reaction. The second solution stream introduces the pulp from the reduction leach stage and contains a small amount of reduced pregnant solution. All of the iron contained in these solutions is originally present as ferrous ion and is oxidized to ferric ion in the reaction described by the following equation:

$$2\ Fe^{+2} + \tfrac{1}{2}O_2 + 2H^+ = 2\ Fe^{+3} + H_2O$$

More specifically this reaction may be described for the chloride system of the present invention by the following equation:

$$2\ FeCl_2 + \tfrac{1}{2}O_2 + 2\ HCL = 2\ FeCl_3 + H_2O$$

The ferric ions formed as shown above, leach the copper, zinc, and iron minerals from the pyrite as shown below:

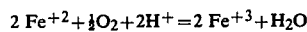
$$CuFeS_2 + 4\ FeCl_3 = CuCl_2 + 5\ FeCl_2 + 2S°$$

$$ZnS + 2\ FeCl_3 = ZnCl_2 + 2\ FeCl_2 + S°$$

$$FeS + 2\ FeCl_3 = 3\ FeCl_2 + S°$$

The dissolved lead and silver are complexed by the chloride and leaching occurs. The equations for galena and argentite are presented below:

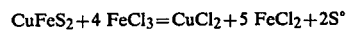
$$PbS + 2\ FeCl_3 = PbCl_2 + 2\ FeCl_2 + S°$$

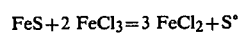
$$Ag_2S + 2\ FeCl_3 + 2\ AgCl = 2\ FeCl_2 + S°$$

As can be seen from the above equations elemental sulphur is generated during the oxidation leach stage, therefore during the last part of the oxidation leach, the pulp is gently agitated to allow the molten elemental sulphur to agglomerate. The elemental sulphur generated during the oxidation leach contains some of the unreacted silver, copper, lead, zinc, and iron sulphide minerals which were entrapped by the molten sulphur as they migrated from the particle state to solution. It has been found that the temperature within the oxidation leach stage directly affects the amount of metals entrapped by the sulphur in that, lower leaching temperatures generally result in higher metal concentrations.

In addition to its effect on the concentration of the metals entrapped by the elemental sulphur, the leaching temperature also has an effect on the amount of the sulphur present in the leached pulp.

At temperatures greater than about 150° C. the rate of oxidation of elemental sulphur to sulphuric acid becomes significant and as the temperature exceeds 175° C. the amount of recoverable elemental sulphur declines rapidly. At 200° C., no elemental sulphur is recovered. It has been found that a temperature range of between about 140° C. and 200° C., yields over 95% extraction of silver, copper, and zinc (including Cu and Zn in sulphur) and about 80% extraction of lead during a one-hour leach. However, due to corrosion problems encountered at high temperatures when using chloride leaching solutions, a temperature range of about 140° C. to 150° C. gives best results, the preferred being about 145° C.

At a temperature of 145° C, the optimal oxygen partial pressure within the leaching stage, supplied as oxygen or air is 150 psia. Pulp densities of up to 300 grams of roasted pyrite per 700 ml of leaching solution react satisfactorily, while pulp densities of under 100 grams of roasted pyrite per 100 ml of leaching solution result in an unsatisfactorily weak pregnant solution.

The concentration of the constituents within the oxidation leach solution will vary depending upon the material being leached, the reaction rate desired, as well as the limits imposed by the nature of the containment vessels. Generally it has been found when using a Kidd Creek pyrite concentrate, that the oxidation leaching stage solution will have the following composition:

| Constituent | Concentration |
|---|---|
| Fe(T) | 4.0–15.0 g/l |
| Cl⁻ | 80–150 g/l |
| SO₄⁻² | 15–45 g/l |

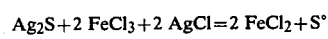

The pH of this solution may vary from about 0.6 to about 1.0, however, in order to prevent acid build-up small amounts of NaOH may be added to the leach solution.

Sulphur Recovery Stage

At the conclusion of the oxidation leach stage the oxidation leach solution is flashed to 100° C. and introduced to the sulphur recovery stage 14. Water, used for washing the final residue and then the sulphur pellets, is added to the pulp to provide further cooling. Th sulphur pellets which form at the time of cooling are next recovered by either screening or flotation. The pellets are washed on a screen with water previously used to wash the oxidation leach residue and then recycled to the fluid bed roaster 10 where the sulphur is converted to sulphur dioxide and the copper and zinc are recovered in the roasted pyrite.

First Solid-Liquid Separation Stage

The oxidation leach pulp, after the sulphur pellets have been removed is subjected to a first solid-liquid separation stage 15 where it is flocculated and settled. The thickened pulp, which contains about 50% solids, is then filtered and washed. The washed residue, containing about 28% moisture, is discarded.

Reduction Leach Stage

The clear lixiviant which results from the solid-liquid separation stage is high in ferric ion. This high concentration of ferric ion would result in excess reductant consumption if metal recovery were attempted. Therefore, in order to reduce the concentration of ferric ions in the solution, it is contacted with fresh roasted pyrite in the reduction leach stage 11. The ferric ions are reduced to ferrous ions by reaction with artificial pyrrhotite contained in the partially roasted pyrite by the following equation:

$$2 FeCl_3 + FeS = 3 FeCl_2 + S°$$

The temperature of the reduction leaching stage may vary considerably, from ambient (22° C.) to the melting point of sulphur. However, over 119° C., the elemental sulphur tends to coat the particles and inhibit reactions. At 100° C., 100% ferric ion reduction can be achieved in 30 minutes with the addition of a large excess of roasted pyrite concentrate. Note that for optimum results during the reduction leaching stage, oxygen partial pressure in the reaction vessel should be zero.

Second Solid-Liquid Separation Stage

When the reduction leach stage has been completed the reduced product is recovered and introduced to a second solid-liquid separation stage 16 where it is flocculated and then filtered. The filter cake is then recycled to the oxidation leach stage for recovery of the residual copper and zinc, as well as the silver and sulphur, while the clear filtrate is processed to recover the copper and zinc. In an alternate embodiment the reduction leach pulp is flocculated and settled. The settled pulp is then recycled to the oxidation leaching stage.

Metal Recovery Stage

Copper may be recovered from the clear filtrate in a variety of ways, including solvent extraction and precipitation. Precipitation may be carried out with a variety of metals, iron being the most common in commercial operations. Zinc may also be used if available, however, zinc tends to co-precipitate lead to some extent.

Lead may be recovered separately by precipitation on metallic zinc after the silver and copper have been recovered. After the solution has been treated to remove the silver, copper, and lead, zinc recovery may be accomplished by solvent extraction.

As can be seen from the drawing, the stripped solution from metal recovery stage 13 is recycled to the oxidation leach stage. A bleed stream 17 isolates a portion of the stripped solution to compensate for water added to the system during washing operations.

Although the solution concentrations in the present invention may vary, estimated solution concentrations are given in the following table. The values for silver, copper, lead and zinc are based on a 30% solids leach and therefore these values would be higher if the pulp densities were increased. On the other hand the iron and sulphate analyses would be expected to remain the same if no changes were made in the pH or temperature. The sodium chloride concentration is sufficient to complex the dissolved metals at up to 50% solids. It is possible, however, that increased sodium chloride concentrations would be required for higher pulp density.

| Solution | Chloride Process Leaching Solution Concentrations | | | | | | |
|---|---|---|---|---|---|---|---|
| | $Ag^+$ pp/m | $Cu^{+2}$ (g/l) | $Pb^{+2}$ (g/l) | $Zn^{+2}$ (g/l) | $Fe^{+2}$ (g/l) | $SO_4^{-2}$ (g/l) | NaCl (g/l) |
| Stripped Solution | 0.0 | 0.00 | 0.00 | 0.10 | 9.7 | 32 | 150 |
| Reduced Pregnant Solution | 29.6 | 0.66 | 1.14 | 9.7 | 9.1 | 31 | 150 |
| Pregnant Solution | 36.0 | 0.80 | 1.39 | 11.9 | 7.4[1] | 38 | 181 |
| Diluted Pregnant Solution | 29.6 | 0.66 | 1.14 | 9.7 | 6.1[1] | 31 | 148 |

[1] Ferric ion ($Fe^{+3}$)

The foregoing process may be illustrated by the following examples.

EXAMPLE I

Pyrite concentrate containing silver, copper, lead and zinc was roasted in a fluid bed roaster at 620° C. until approximately 80% of the sulphur contained therein was eliminated. The roasted pyrite was then subjected to an oxidation leach stage using a chloride solution. The temperature within the oxidation leach stage was 145° C. at an oxygen partial pressure of 150 psia. The pulp density was 30% solids and the sodium chloride concentration was 204 g/l. After 1 hour of leaching the solution was flashed to 100° C., the sulphur separated and the metal values recovered. The following are the amounts of metals recovered from the solution and sulphur based on the amount of metal contained in the roasted pyrite.

| PERCENT METAL EXTRACTED (by weight) | | | | | |
|---|---|---|---|---|---|
| PRODUCT PHASE | Ag | Cu | Pb | Zn | Fe |
| Solution | 96 | 93 | 82 | 83 | 1 |
| Sulphur | 0 | 3 | 0 | 13 | |
| Total | 96 | 96 | 82 | 96 | 1 |

EXAMPLE II

Pyrite concentrate was subjected to the process of Example I except that 56% sulphur elimination was effected. The clear lixiviant from the oxidation leach stage was then contacted with freshly roasted pyrite containing about 9.0 g/g $Fe^{+3}$ in a reduction leach stage at a pH of 0.92. It was found that 100% $Fe^{+3}$ reduction was accomplished. During the reduction leach metals were dissolved from the roasted pyrite as described below:

| Metal Extracted | Percent Metal Extracted (by weight) |
|---|---|
| Pb | 81 |
| Zn | 68 |
| Fe | 44 |

It will be apparent to workers skilled in this art that the foregoing process, while described with respect to certain preferred and exemplary materials and conditions, is subject to numerous other variations and alternations easily ascertainable from the description contained herein without departing from the scope and spirit of the invention as defined by the appended claims.

What is claimed is:

1. A process for recovery of silver, copper, lead and zinc from a pyrite concentrate, comprising the steps of:
    (a) partially roasting the pyrite concentrate to open the pyrite matrix to solution penetration by driving off a portion of the sulphur contained therein;
    (b) leaching with an acidic chloride solution containing dissolved iron the bulk of the roasted pyrite concentrate to extract the silver, copper, lead and zinc from therein;
    (c) cooling the oxidation leached pulp and recovering the elemental sulphur generated during the leaching;
    (d) subjecting the solution resulting from the oxidation leach, containing the silver, lead, copper and zinc to a reduction leach stage wherein ferric ions contained therein are reduced to ferrous ions;
    (e) introducing the reduced solution from said reduction stage to a metal recovery stage wherein the silver, copper, lead and zinc are recovered.

2. The process of claim 1 wherein said pyrite concentrate is roasted until about 45% to about 80% of the sulphur contained therein is driven off.

3. The process of claim 2 wherein the pyrite concentrate is roasted at a temperature of from about 550° C. to about 700° C.

4. The process of claim 1 wherein the pyrite concentrate is leached using a acid-chloride solution at a temperature range of from about 140° C. to about 200° C.

5. The process of claim 4 wherein the temperature is about 145° C.

6. The process of claim 5 wherein the pulp density within the oxidation leach stage is from about 100 grams to about 300 grams of roasted pyrite per 700 ml of leaching solution.

7. The process of claim 5 wherein the oxygen partial pressure within the oxidation leach stage is about 150 psia.

8. The process of claim 1 wherein the reduction stage comprises contacting the oxidation leach solution with a small amount of freshly roasted pyrite concentrate at a temperature of from about 22° C. to about 119° C. at an oxygen partial pressure of zero.

9. The process of claim 8 which further comprises flocculating and filtering the product from the reduction stage in a solid-liquid separation stage to produce a filter cake and filtrate, said filter cake being recycled to said oxidation leach stage to recover any residual copper, zinc, silver or sulphur contained therein and said filtrate being processed to recover the metal values therein.

10. The process of claim 9 wherein the stripped solution from the metal recovery stage is recycled to said oxidation leach stage.

11. A process for the recovery of silver, copper, lead, and zinc from a pyrite concentrate, comprising the steps of:
    (a) partially roasting the pyrite concentrate at a temperature of from about 550° C. to about 700° C. until about 80% of the sulphur contained therein is driven off;
    (b) introducing the majority of the partially roasted pyrite to an oxidation leach stage to extract the silver, copper, lead and zinc values contained therein, said leach being accomplished using an acid chloride solution at a temperature of about 145° C. containing dissolved iron and the partial pressure within said leach stage being about 150 psia;
    (c) cooling the oxidation leached pulp by flashing and recovering the elemental sulphur generated during the oxidation stage;
    (d) subjecting the oxidation leached solution, containing the silver, lead, copper and zinc to a reduction leach stage, said reduction leach stage comprising contacting the oxidation leached solution with a small amount of freshly roasted pyrite concentrate at a temperature of from about 22° C. to about 119° C. and maintaining the oxygen partial pressure within said reduction stage at zero;
    (e) introducing the reduced solution from said reduction stage to a solid-liquid separation stage wherein said solution is flocculated and filtered to produce a filter cake and filtrate;
    (f) processing the filtrate from said solid-liquid separation stage to recover silver, copper, lead and zinc and;
    (g) recycling said filter cake from said solid-liquid separation stage to the oxidation leaching stage to recover any residual copper and zinc contained therein.

12. The process of claim 11 wherein the elemental sulphur generated during leaching is recycled to the pyrite roasting stage where it is burned to form sulphur dioxide.

13. The process of claim 11 wherein the copper and silver contained in the filtrate produced by the solid-liquid separation stage is recovered by solvent extraction and precipitation.

14. The process of claim 13 wherein subsequent to the recovery of copper and silver, lead is recovered by precipitation on metallic zinc.

15. The process of claim 14 wherein zinc is recovered by solvent extraction after silver, copper and lead have been recovered.

* * * * *

UNITED STATES PATENT AND TRADEMARK OFFICE
CERTIFICATE OF CORRECTION

PATENT NO. : 4,168,969
DATED : September 25, 1979
INVENTOR(S) : Terry W. Pepper and Harry G. Bocckino It is certified that error appears in the above-identified patent and that said Letters Patent are hereby corrected as shown below:

Col. 3, line 61 "=" should be changed to --+--.

Col. 4, line 61 "Th" should be changed to --The--.

Signed and Sealed this

Twenty-second Day of January 1980

[SEAL]

Attest:

SIDNEY A. DIAMOND

Attesting Officer     Commissioner of Patents and Trademarks